(12) United States Patent
Nainar et al.

(10) Patent No.: US 11,150,963 B2
(45) Date of Patent: Oct. 19, 2021

(54) REMOTE SMART NIC-BASED SERVICE ACCELERATION

(71) Applicant: Cisco Technology, Inc., San Jose, CA (US)

(72) Inventors: Nagendra Kumar Nainar, Morrisville, NC (US); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 77 days.

(21) Appl. No.: 16/289,412

(22) Filed: Feb. 28, 2019

(65) Prior Publication Data

US 2020/0278892 A1    Sep. 3, 2020

(51) Int. Cl.
*G06F 9/54* (2006.01)
*G06F 9/50* (2006.01)
(Continued)

(52) U.S. Cl.
CPC .......... *G06F 9/541* (2013.01); *G06F 9/45558* (2013.01); *G06F 9/5055* (2013.01); *G06F 2009/45595* (2013.01)

(58) Field of Classification Search
CPC .... G06F 9/541; G06F 9/5055; G06F 9/45558; G06F 2009/45595
(Continued)

(56) References Cited

U.S. PATENT DOCUMENTS 9,749,413 B2 * 8/2017 Hefty ................... G06F 13/24
10,129,153 B2 * 11/2018 Caulfield ............... H04L 47/12
(Continued)

FOREIGN PATENT DOCUMENTS

| WO | WO-2017141081 A1 * | 8/2017 | ............. H04L 45/12 |
| WO | WO-2019030552 A1 * | 2/2019 | ............. H04L 12/26 |
| WO | WO-2019145938 A1 * | 8/2019 | ............. H04L 29/06 |

OTHER PUBLICATIONS

Le et al., "UNO: Unifying Host and Smart NIC Offload for Flexible Packet Processing," wisr.cs.misc.edu, Sep. 24-27, 2017, pp. 506-519.
(Continued)

*Primary Examiner* — David R Lazaro
*Assistant Examiner* — Berhanu Shitayewoldetadik
(74) *Attorney, Agent, or Firm* — Polsinelli

(57) ABSTRACT

Systems and methods provide for accelerating and offloading network processing to a remote smart network interface card (NIC). A first network element, including a first smart NIC, can transmit capability information of the first smart NIC for receipt by a neighboring second network element. The second network element can determine that a network processing task of a virtualized network function (e.g., virtual network function (VNF), cloud-native network function (CNF), etc.) instantiated on the second network element can be offloaded to the first smart NIC. The second network element can receive processing information from the virtualized network function for performing the network processing task. Based on the processing information, the second network element can transmit control information that causes the first smart NIC to perform the network processing task on at least a portion of network data received by the first network element for transmission to the second network element.

20 Claims, 9 Drawing Sheets

(51) Int. Cl.
*G06F 9/455* (2018.01)
*H04L 12/721* (2013.01)
*H04L 12/717* (2013.01)
*H04L 12/723* (2013.01)

(58) Field of Classification Search
USPC .......................................................... 709/225
See application file for complete search history.

(56) References Cited

U.S. PATENT DOCUMENTS

| | | | | | |
|---|---|---|---|---|---|
| 2003/0074473 | A1* | 4/2003 | Pham | ...................... | H04L 29/06 709/246 |
| 2003/0218990 | A1* | 11/2003 | Tung | ................... | H04B 7/15557 370/279 |
| 2004/0078462 | A1* | 4/2004 | Philbrick | .............. | H04L 69/163 709/224 |
| 2008/0049775 | A1* | 2/2008 | Morrill | ............... | H04L 41/5003 370/419 |
| 2010/0333101 | A1* | 12/2010 | Pope | ........................ | H04L 47/10 718/103 |
| 2013/0151685 | A1* | 6/2013 | Bursell | ................... | G06F 9/455 709/223 |
| 2013/0297753 | A1* | 11/2013 | Lu | ........................ | G06F 9/45558 709/220 |
| 2014/0112135 | A1* | 4/2014 | Huang | .................. | H04W 48/14 370/231 |
| 2014/0310149 | A1* | 10/2014 | Singh | ..................... | G06Q 40/06 705/37 |
| 2016/0232019 | A1* | 8/2016 | Shah | ................... | G06F 9/45558 |
| 2016/0301579 | A1* | 10/2016 | Djukic | ................. | H04L 41/5009 |
| 2017/0244817 | A1* | 8/2017 | Zhang | ..................... | H04L 69/24 |
| 2017/0250914 | A1* | 8/2017 | Caulfield | ............ | H04L 43/0882 |
| 2017/0272354 | A1* | 9/2017 | Chen | ...................... | H04L 43/50 |
| 2017/0366605 | A1* | 12/2017 | Chang | ................. | H04L 67/1008 |
| 2018/0109471 | A1* | 4/2018 | Chang | ..................... | H04L 49/70 |
| 2019/0014112 | A1* | 1/2019 | Lacey | ..................... | G06F 21/44 |
| 2019/0020588 | A1* | 1/2019 | Twitchell, Jr. | .......... | H04L 67/06 |
| 2019/0045037 | A1* | 2/2019 | Sukhomlinov | ..... | H04L 12/4641 |
| 2019/0050274 | A1* | 2/2019 | Dinan | ....................... | G06F 9/52 |
| 2019/0253184 | A1* | 8/2019 | Xing | ..................... | H04W 24/10 |
| 2020/0067827 | A1* | 2/2020 | Mei | ......................... | H04L 12/28 |
| 2020/0076875 | A1* | 3/2020 | Sabella | ................... | H04L 67/10 |
| 2020/0110626 | A1* | 4/2020 | Kochevar-Cureton | ....................... | H04L 12/4645 |
| 2020/0162307 | A1* | 5/2020 | Chen | ................... | H04L 41/5054 |
| 2021/0092052 | A1* | 3/2021 | Tantsura | ................ | H04L 45/12 |

OTHER PUBLICATIONS

International Search Report and Written Opinion from the International Searching Authority, dated May 20, 2020, 10 pages, for corresponding International Patent Application No. PCT/US2020/019979.

* cited by examiner

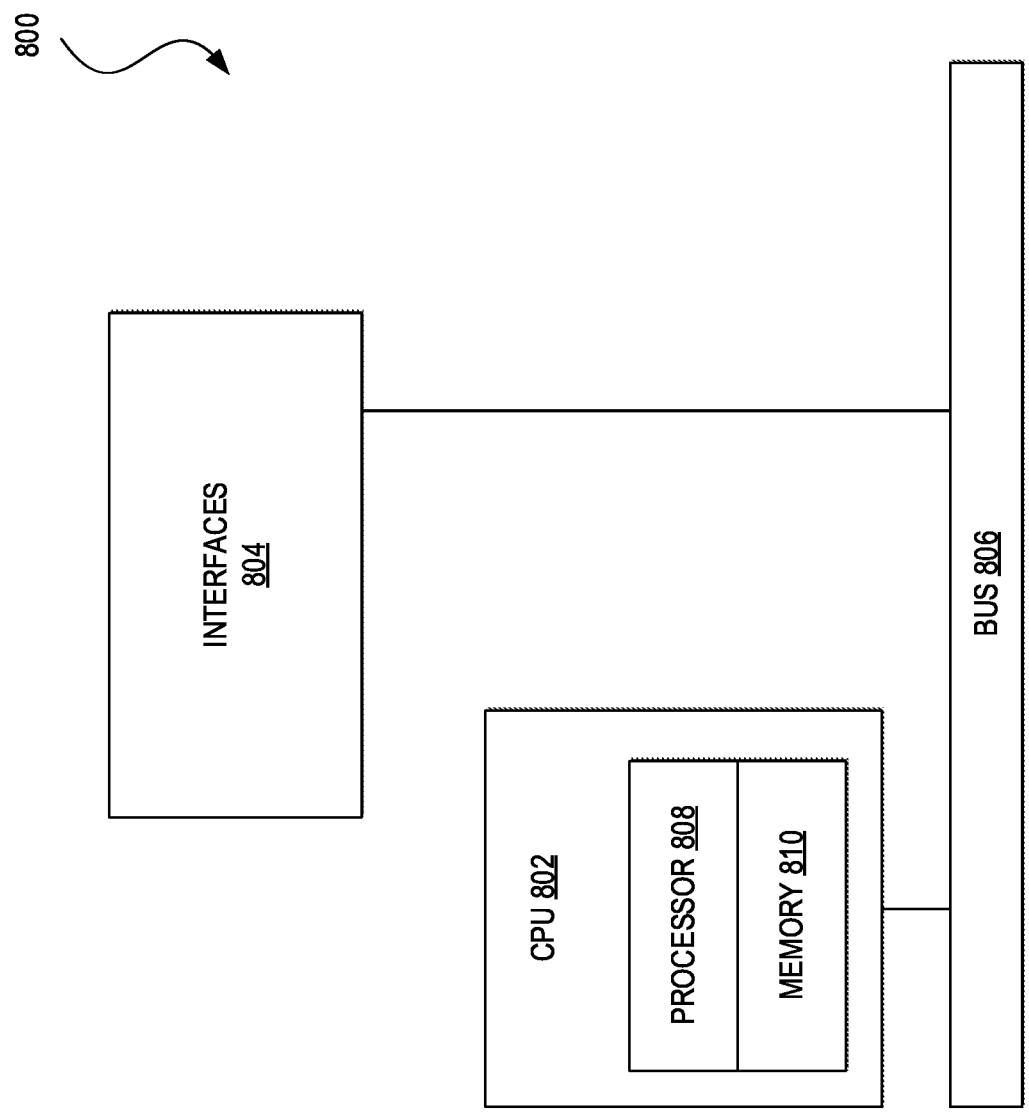

REMOTE SMART NIC-BASED SERVICE ACCELERATION

TECHNICAL FIELD

The subject matter of this disclosure relates in general to the field of computer networking, and more particularly, to systems and methods for accelerating and offloading network processing tasks to remote smart network interface cards (NICs).

BACKGROUND

Smart NICs are network adapters that can include or comprise application-specific integrated circuits (ASICs), field programmable gate arrays (FPGAs), graphical processing units (GPUs), or other hardware for accelerating various network processing tasks and offloading the tasks from a central processing unit (CPU) or network processing unit (NPU) of a network element (e.g., server, network device, network appliance, etc.). Smart NICs are increasingly deployed in virtualized computing environments because of the intelligence and programmability that these components can provide to the network elements. For example, smart NICs can allow network elements to offload cloud-native service state information and accelerate packet forwarding and processing tasks, such as Transmission Control Protocol (TCP) acceleration, encryption/decryption, Quality of Service/Access Control List (QoS/ACL) processing, and flow monitoring/reporting, among others. Current implementations limit the acceleration and offloading performed by smart NICs to their physical hosts but it can be costly to replace standard NICs with smart NICs in every element of a network.

BRIEF DESCRIPTION OF THE FIGURES

To provide a more complete understanding of the present disclosure and features and advantages thereof, reference is made to the following description, taken in conjunction with the accompanying drawings, in which:

FIG. 8 illustrates a block diagram of an example of a network device in accordance with an embodiment.

DESCRIPTION OF EXAMPLE EMBODIMENTS

Figure 1:
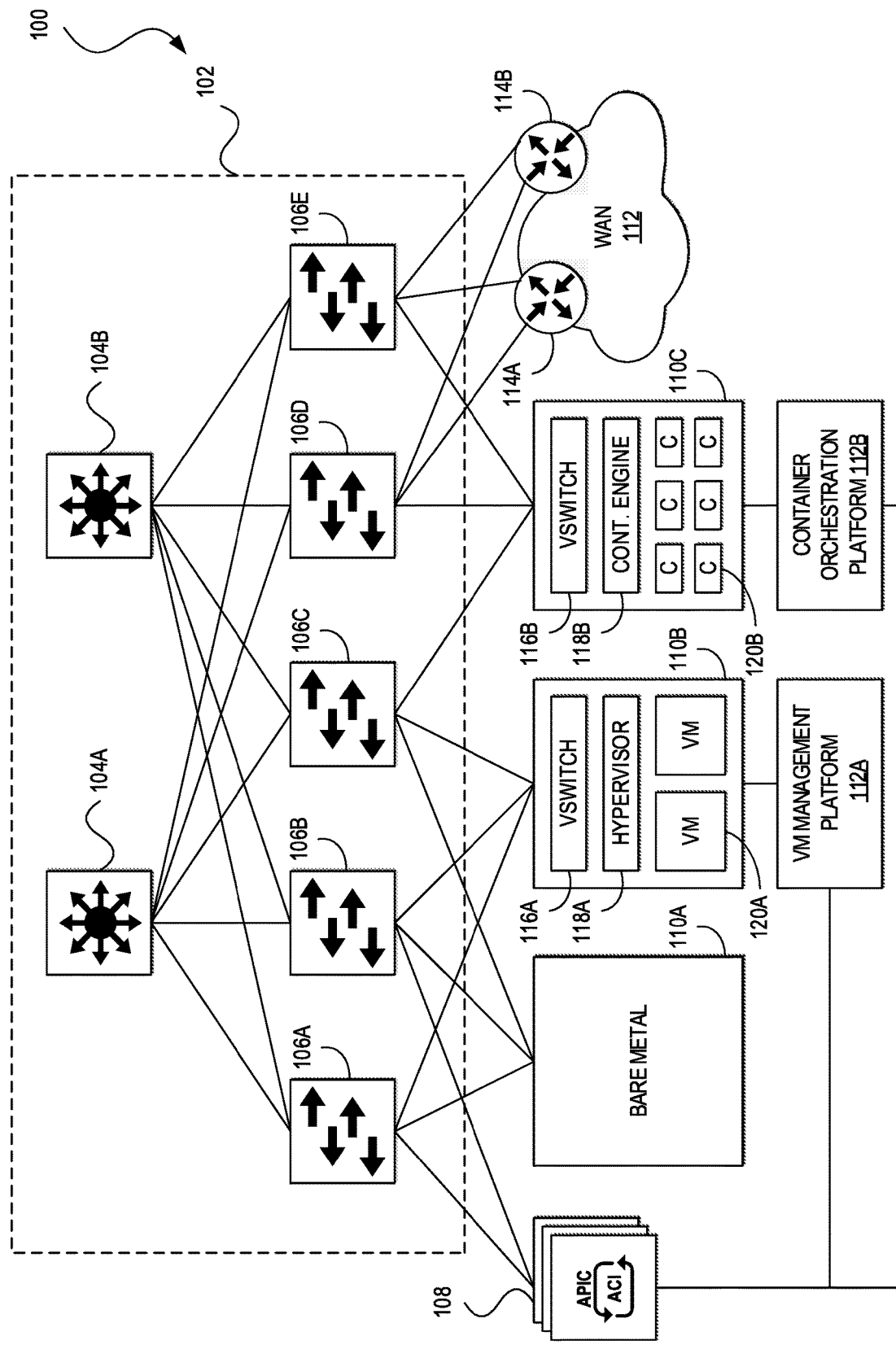
FIG. 1 illustrates a block diagram of an example of a network in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for accelerating and offloading network processing tasks of virtualized network functions (V-NFs) (e.g., virtual network functions (VNFs), cloud-native network functions (CNFs), etc.) to remote smart network interface cards (NICs) (remote relative to a physical host of the V-NF). A first network element (e.g., physical or virtual server or network device) including a first smart NIC can exchange the capabilities of the first smart NIC with one or more neighboring network elements. The exchange can occur over the data plane (e.g., via in-band or in-situ operations, administration, and management (IOAM)) and/or the control plane (e.g., via Cisco® Discovery Protocol (CDP), Link Layer Discovery Protocol (LLDP), Extended Address Resolution Protocol (E-ARP), Neighbor Discovery Protocol (NDP), etc.). A second network element can determine that one or more network processing tasks of a V-NF instantiated on the second network element can be offloaded to the first smart NIC. That is, the second network element can determine that the first smart NIC is capable of performing the one or more network processing tasks based on the exchange. The second network element can receive processing information from the V-NF for performing the one or more network processing tasks. For example, the second network element can signal the capability information of the first smart NIC to the V-NF and the V-NF can determine to offload the one or more network processing tasks and then transmit the offload instructions to the second network element. Alternatively, the second network element may determine that the one or more network processing tasks can be offloaded from the V-NF and then retrieve the offload instructions from the V-NF. Based on the processing information, the second network element can transmit control information that causes the first smart NIC to perform the one or more network processing tasks on at least a portion of network data received by the first network element for transmission to the second network element.

In some embodiments, the second network element may have access to a second smart NIC. For example, the second smart NIC may be integrated in the first network element, the second network element, or a third network element neighboring the second network element. If so, the second network element can determine a current load of at least one of the first smart NIC and/or the second smart NIC and transmit the control information in a manner that causes the first smart NIC to perform the one or more network processing tasks on a first amount of the network data and that causes the second smart NIC to perform the one or more network processing tasks based on the current load. For example, the second network element can determine how to apportion the network data received by the first network element for transmission to the second network data based on the current load. Then, the second network element can transmit control information to the first network element that causes the first smart NIC to perform the one or more network processing tasks on a first apportioned amount of the network data and that causes the second smart NIC to perform the one or more network processing tasks on a second apportioned amount of the network data.

EXAMPLE EMBODIMENTS

FIG. 1 illustrates a block diagram of an example of a network 100 for implementing various embodiments of the present disclosure. An example of an implementation of the network 100 is the Cisco® Application Centric Infrastructure (Cisco ACI®) of Cisco Systems®, Inc. (Cisco®). However, one of ordinary skill in the art will understand that, for the network 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In some embodiments, the network 100 can include a network fabric 102 comprising spine switches 104A and 104B (collectively, 104) and leaf switches 106A, 106B, 106C, 106D, and 106E (collectively, 106). The leaf switches 106 can connect to the spine switches 104 in a full-mesh topology or spine-and-leaf topology. The spine switches 104 can operate as the backbone of the network 100 and interconnect the leaf switches 106. For example, every leaf switch 106 can connect to every spine switch 104 in the network fabric 102, and the paths within the network fabric 102 may be randomly chosen so that the traffic load can be evenly distributed among the spine switches 104. In this manner, network performance may only slightly degrade if one of the spine switches 104 fails. If oversubscription of a link occurs (e.g., if more traffic is generated than can be aggregated on an active link at one time), the process for expanding capacity can involve adding an additional spine switch 104 and extending uplinks to every leaf switch 106. This can add inter-layer bandwidth and reduce oversubscription. If access port capacity becomes an issue, a new leaf switch can be added by connecting it to every spine switch 104 and adding the network configuration to the new leaf switch. If no oversubscription occurs between the leaf switches 106 and their uplinks, then a non-blocking architecture can be achieved.

The leaf switches 106 can include fabric ports and access ports (non-fabric ports). The fabric ports can provide the uplinks to the spine switches 104, while the access ports can provide connectivity to physical servers (e.g., rack-mount servers, blade servers, or other computing devices) and virtualized servers (e.g., virtual machines, containers, or other virtual partitions). In this example, the leaf switches 106 can interconnect physical servers 110A, 110B, and 110C (collectively, physical servers 110) and virtual machines 120A and containers 120B (collectively, virtualized servers 120). Some examples of physical servers include Cisco® Unified Computing System (Cisco UCS®) B-Series Blade Servers, Cisco UCS® C-Series Rack Servers, Cisco UCS® S-Series Storage Servers, Cisco UCS® E-Series Blade Servers, and Cisco HyperFlex™ HX-Series nodes, among others.

In some embodiments, one or more of the physical servers 110 (e.g., the physical server 110B) may each have instantiated thereon a hypervisor 118A for creating and running one or more virtual machines 120A. In some embodiments, the virtual machine(s) 120A may host one or more containers. In other embodiments, one or more of the physical servers 110 (e.g., the physical server 110C) may each run a container engine 118B for hosting one or more containers 120B (e.g., bare metal containers). In still other embodiments, one or more of the physical servers 110 can run other software and include other components for supporting other types of virtual partitions. Networks in accordance with various embodiments may include any number of physical servers hosting any number of virtual machines, containers, or other virtual partitions. A physical server may also operate as a bare metal server 110A (e.g., non-virtualized server or a physical server without virtual machines, containers, or other virtual partitions).

The leaf switches 106 can also provide connectivity to various types of physical and virtual network devices, including network fabric interconnects (e.g., Cisco UCS® 6200 Series fabric interconnects, 6300 Series fabric interconnects, 6454 fabric interconnects, etc.); switches (e.g., Cisco® Catalyst switches, Cisco Nexus® switches, Cisco® Industrial Ethernet switches, Cisco Meraki® MS switches, etc.); routers (e.g., Cisco® Integrated Services Routers (ISRs), Cisco® Aggregation Services Routers (ASRs), Cisco® Network Convergence Systems (NCS) routers, Cisco Meraki® MX systems, etc.); access points (e.g., Cisco Aironet® access points, Cisco Meraki® MR access points, Cisco® Small Business access points, etc.); wireless network controllers (e.g., Cisco Catalyst® wireless LAN controllers (WLCs), Cisco® 8540 WLCs, Cisco® 5520 WLCs, Cisco® 3504 WLCs, etc.); network management appliances (e.g., Cisco® Application Policy Infrastructure Controller (APIC™) appliances, Cisco Digital Network Architecture (DNA™) Center appliances, Cisco Prime® appliances, etc.); firewalls or other network security appliances and services (e.g., Cisco® Advanced Malware Protection (AMP) appliances, Cisco® Industrial Security Appliances (ISAs), Cisco® Adaptive Security Appliances (ASAs), Cisco® Identity Services Engine (ISE) appliances, Cisco Firepower® appliances, Cisco® Content Security Management appliances, Cisco® Security Packet Analyzers, etc.); network analytics appliances (e.g., Cisco Tetration® appliances); and other network appliances and services. In this example, the leaf switches 106 are shown interconnecting network fabric controller 108, edge routers 114A and 114B, and virtual switches 116A and 116B to the network fabric 102.

The network fabric controller 108 can operate as a centralized point of configuration and management for the network fabric 102. In some embodiments, the network fabric controller 108 may be implemented using Cisco APIC™. Cisco APIC™ can provide a centralized point of automation and management, policy programming, application deployment, and health monitoring for the network fabric 102. In this example, the APIC™ can be embodied as a replicated, synchronized, and clustered set of network fabric controller appliances. In other embodiments, other configurations or network management platforms can be utilized for administering the network fabric 102, such as Cisco DNA™ Center, Cisco® Software Defined-WAN (SD-WAN), and Cisco Prime®, among others.

The network fabric controller 108 may operate in combination with one or more virtual machine management platforms 112A (e.g., VMware vSphere®, Microsoft® System Center Virtual Machine Manager, etc.) or container orchestration platforms 112B (e.g., Cisco® Container Platform, Kubernetes® (k8s™), Docker Swarm®, Apache Mesos®, Istio®, Linux Foundation Linkerd™, Hashicorp Consul®, etc.) (collectively, virtualization management platforms 112) for deploying the virtual machines 120A and containers 120B (collectively, virtual servers), respectively. The virtual machine management platform 112A can be used to administer a virtual switch 116A (e.g., Cisco® Application Virtual Switch (AVS), Cisco ACI™ Virtual Edge, Cisco Nexus® 1000VE, Cisco Nexus® 1000V, Open Virtual Switch (OVS), etc.), hypervisor 118A, and one or more virtual machines 120A instantiated on a single physical server 110B; a distributed virtual switch or multiple virtual switches, multiple hypervisors, and multiple virtual machines spanning multiple physical servers; or other virtual machine computing environments. Similarly, the container orchestration platform 112B can be used to administer a virtual switch 116B (e.g., OVS, OVS with Intel® Data Plane Development Kit (DPDK), OVS with Contiv plugin, etc.), container engine 118B (e.g., Docker®, CoreOS® rkt, Linux® Containers (LXC), etc.), and one or more containers 120B instantiated on a single physical servers 110C; a distributed virtual switch or multiple virtual switches, multiple container runtimes, and multiple containers spanning multiple physical servers or virtual machines; and other containerized computing environments.

In addition to the network fabric controller 108, the leaf switches 106 can also connect the network fabric 102 to other physical and virtual network devices, such as a switch, router, application accelerator, network address translator (NAT), load balancer, firewall, a distributed denial of service (DDoS) mitigator, deep packet inspector (DPI), intrusion prevention system (IPS), intrusion detection system (IDS), Internet Protocol Security (IPSec) system, session border controller (SBC), traffic monitor, Evolved Packet Core (EPC) function, WAN optimizer, and so forth. These network devices can be implemented in hardware as physical network devices and/or in software using general-purpose CPUs, network processing units (NPUs), network interface controllers (NICs), smart NICs, and so forth (e.g., virtualized network devices (V-NFs) executing within virtual machines (e.g., virtual network functions (VNFs)), containers (e.g., cloud-native functions (CNFs)), or other virtual partitions. In some embodiments, the network fabric controller 108 can provide automatic service insertion based on policies defined by an operator of the network 100. The network fabric controller 108 can use service graphs (e.g., ordered sets of service function nodes between a set of endpoints and set of network service functions specified for an application) to push the needed configuration and security policies to the network 100.

In some embodiments, the leaf switches 106 can also connect endpoint groups (EPGs) to the network fabric 102 and other networks (e.g., the WAN 112). EPGs can be groupings of applications, or application components, and tiers for implementing forwarding and policy logic. EPGs can allow for separation of network policy, security, and forwarding from addressing by using logical application boundaries. EPGs can be used in the network 100 for mapping applications in the network. For example, EPGs can comprise a grouping of endpoints in the network 100 indicating connectivity and policy for applications.

In this example, the leaf switches 106D and 106E can operate as border leaf switches in communication with the edge routers 114A and 114B for providing connectivity to wide area network (WAN) 112. WANs can connect geographically dispersed nodes over long-distance communications links, such as common carrier telephone lines, optical light paths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The nodes can include any communication device or component, such as a computer, server, blade, hypervisor, virtual machine, container, process (e.g., running in a virtual machine, container, or other virtual partition), switch, router, gateway, host, device, network, etc.

In some embodiments, the network 100 may connect to external networks of public cloud providers via a private network connection (not shown) or the WAN 112 for additional compute, storage, and/or network resources in an architecture sometimes referred to as a hybrid cloud or multi-cloud. A hybrid cloud can include the combined compute, storage, and/or network resources of a private network or cloud (e.g., the network 100) and a public cloud to perform workloads of an operator of the network 100. A multi-cloud can combine compute, storage, and/or network resources of a private cloud with the resources of multiple public cloud providers.

Although the network fabric 102 is illustrated and described herein as a spine-and-leaf architecture, one of ordinary skill in the art will readily recognize that various embodiments can be implemented based on any network topology, including any enterprise or data center network fabric. Indeed, other architectures, designs, infrastructures, and variations are contemplated herein. For example, the principles disclosed herein are applicable to topologies including three-tier (e.g., core, aggregation, and access levels), fat tree, mesh, bus, hub and spoke, and so forth. In some embodiments, the leaf switches 106 can be top-of-rack switches configured according to a top-of-rack architecture. In other embodiments, the leaf switches 106 can be aggregation switches in any particular topology, such as end-of-row or middle-of-row topologies. In some embodiments, the leaf switches 106 can also be implemented using aggregation switches.

Moreover, the topology illustrated in FIG. 1 and described herein is readily scalable and may accommodate a large number of components, as well as more complicated arrangements and configurations. For example, the network may include any number of fabrics 102, which may be geographically dispersed or located in the same geographic area. Thus, network nodes may be used in any suitable network topology, which may include any number of physical servers, virtual machines, containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Figure 2:
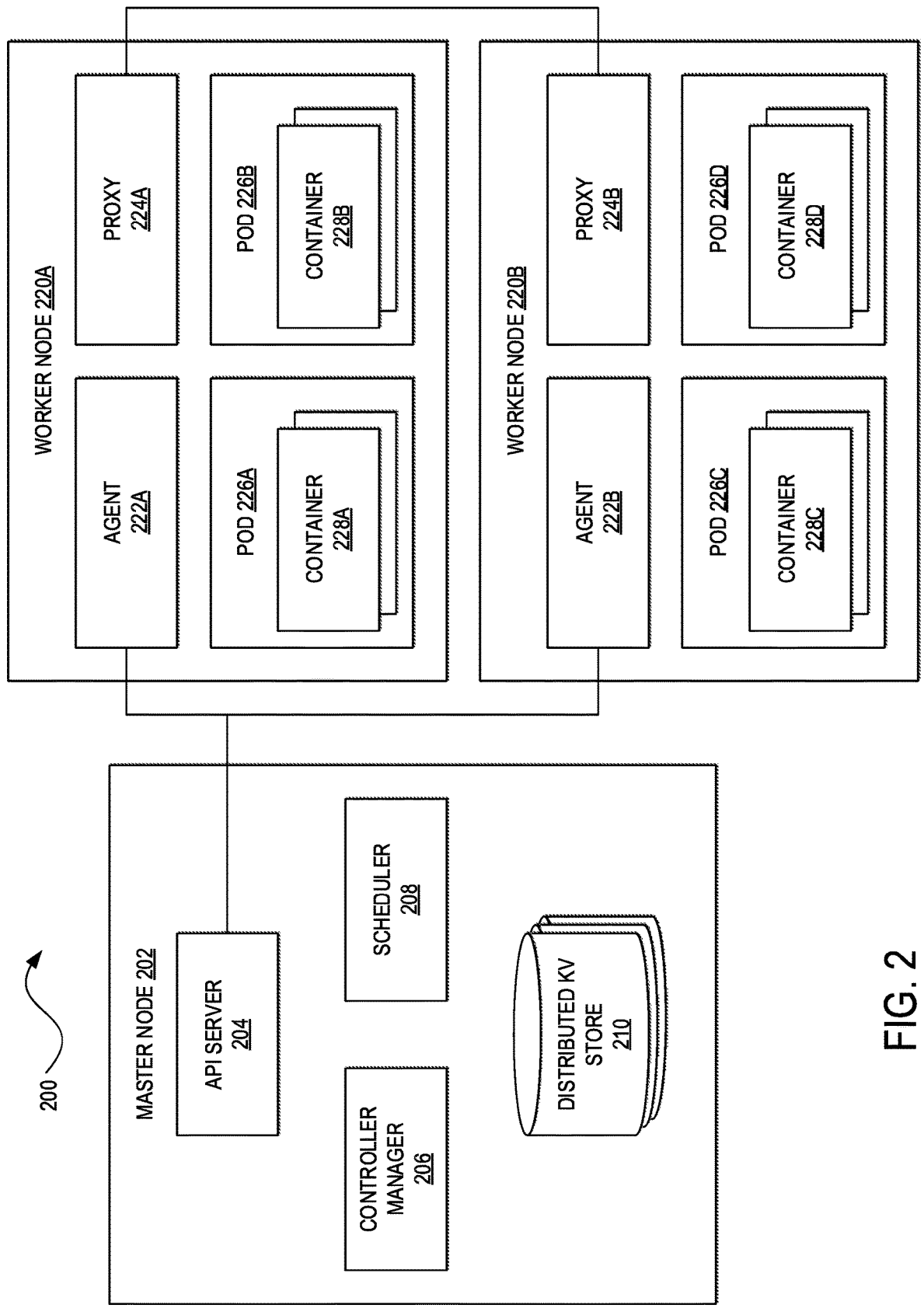
FIG. 2 illustrates a block diagram of an example of an application container orchestration platform in accordance with an embodiment.

FIG. 2 illustrates a block diagram of an example of an application container orchestration platform 200 (e.g., the container orchestration platform 112B) for managing containers in a network (e.g., the network 100). In some embodiments, the application container orchestration platform 200 may be based on Kubernetes®. Kubernetes® is an open source application container orchestration system for automating deployment, scaling, and management of application containers across clusters of hosts. However, other embodiments may deploy other application container orchestration platforms (e.g., Cisco® Container Platform, Docker Swarm®, Apache Mesos®, etc.); other service container orchestration platforms or service mesh platforms (e.g., Cisco® Container Platform, Istio®, Linux Foundation Linkerd™, Hashicorp Consul®, etc.); or other container orchestrator without departing from the scope of the present disclosure.

The application container orchestration platform 200 can comprise one or more clusters. A cluster can be a collection of compute, storage, and network resources that the application container orchestration platform 200 can use to run the various workloads of a network. Each cluster can comprise one or more hosts (e.g., physical servers or virtual machines). In this example, master node 202 and worker nodes 220A and 220B (collectively, 220) can represent a single cluster. Although there is one master node 202 here, other embodiments may include multiple masters to provide high availability.

The master node 202 can operate as a control plane for a cluster. For example, the master node 202 can be responsible for the global, cluster-level scheduling of pods (e.g., sets of one or more containers) and the handling of events (e.g., starting up a new pod when additional computing resources are needed). The master node 202 can include an Application Programming Interface (API) server 204, a controller manager 206, a scheduler 208, and a distributed Key Value (KV) store 210. The master components can run on any host in the cluster but usually run on the same (physical or virtual) machine without worker nodes.

The API server 204 (e.g., kube-apiserver) can operate as the front-end of the control plane, and can expose the API (e.g., Kubernetes® API) of the application container orchestration platform 200. The API server 204 can scale horizontally (e.g., scale by deploying more instances) as it can be stateless and store data in the distributed KV store 210.

The controller manager 206 (e.g., kube-controller-manager, cloud-controller-manager, etc.) can be a collection of various managers rolled up into one binary. The controller manager 206 can include a node controller, replication controller, endpoints controller, service controller, volume controller, and so forth. The node controller can be responsible for managing pod availability and bringing nodes back up when they go down. The replication controller can ensure that each replication controller instance in the system has the correct number of pods. The endpoints controller can control endpoint records in the API and manage domain name system (DNS) resolution of a pod or set of pods backing a service that defines selectors. The service controller can be responsible for creating, updating, and deleting network services (e.g., firewalling, load balancing, deep packet inspection, etc.). The volume controller can be responsible for creating, attaching, and mounting volumes.

The scheduler 208 (e.g., kube-scheduler) can be responsible for scheduling pods into nodes. This can involve evaluation of resource requirements, service requirements, hardware/software policy constraints, node affinity and anti-affinity specifications, pod affinity and anti-affinity specifications, data locality, and deadlines, among other factors.

The distributed KV store (e.g., etcd) 210 can be a high-availability distributed data store. The application container orchestration platform 200 can use the distributed KV store 210 to store cluster state information. In a small, short-lived cluster, a single instance of the KV store 210 can run on the same host as other master components. For larger clusters, the distributed KV store 210 may comprise a cluster of hosts (e.g., 3-5 nodes) for redundancy and high availability.

Worker nodes 220 can maintain running pods and provide a runtime environment (not shown) for the application container orchestration platform 200. The container runtime can be responsible for running containers (e.g., Docker®, rkt from CoreOS®, Inc., runC from the Open Container Initiative™, etc.). Each of the worker nodes 220 can correspond to a single host, which can be a physical or virtual machine. Each worker node 220 can include an agent 222 (e.g., kubelet) and a proxy 224 (e.g., kube-proxy, OVS, OVS/Contiv, etc.).

The agent 222 can run on each node 220 in a cluster and ensure that containers (e.g., containers 228A, 228B, 228C, etc. (collectively, 228)) are running in a pod (e.g., pods 226A, 226B, 226C, etc. (collectively, 226)). The agent 222 can oversee communications with the master node 202, including downloading secrets from the API server 204, mounting volumes, or reporting the status of the node 220 and each pod 226.

A pod is the unit of work in the application container orchestration platform 200. Pods can help to manage groups of closely related containers that may depend on each other and that may need to cooperate on the same host to accomplish their tasks. Each pod 226 can include one or more containers 228. Pods can be scheduled together and run on the same machine. The containers 228 in each pod 226 can have the same IP address and port space; they can communicate using localhost or standard inter-process communication. In addition, the containers 228 in each pod 226 can have access to shared local storage on the node 220 hosting the pod. The shared storage can be mounted on each container 228.

The proxies 224 can be responsible for container networking, including low-level network housekeeping on each node, reflection of local services, TCP and UDP forwarding, finding cluster IPs through environmental variables or Domain Name System (DNS). In some embodiments, the application container orchestration platform 200 may employ a networking model that relates how the master node 202, worker nodes 220, pods 226, and containers 228 interact with one another, such as ensuring that containers can communicate with other containers without NAT, nodes can communicate with containers (and vice-versa) without NAT, and the IP address that a container sees itself as is the same IP address that others see it as. This networking model can assign IP addresses at the pod level such that containers within a pod share an IP address and port space. This networking model can also enable containers within a pod to reach other containers' ports on localhost.

The application container orchestration platform 200 can enable intra-node communication or pod-to-pod communication within the same node via a local file system, IPC mechanism, or localhost. The application container orchestration platform 200 can support various approaches for inter-node communication or pod-to-pod communication across nodes, including L2 (switching), L3 (routing), and overlay networking. The L2 approach can involve attaching an L2 network to a node's physical network interface controller (NIC) and exposing the pod directly to the underlying physical network without port mapping. Bridge mode can be used to enable pods to interconnect internally so that traffic does not leave a host unless necessary. The L3 approach may not use overlays in the data plane, and pod-to-pod communication can happen over IP addresses leveraging routing decisions made by node hosts and external network routers. Pod-to-pod communication can utilize Border Gateway Protocol (BGP) peering to not leave the host, and NAT for outgoing traffic. An overlay approach can use a virtual network that may be decoupled from the underlying physical network using tunneling technology (e.g., Virtual Extensible LAN (VXLAN), Generic Routing Encapsulation (GRE), Segment Routing (SR), etc.). Pods in the virtual network can find each other via tunneling. In addition, L2 networks can be isolated from one another, and L3 routing can be utilized for inter-node pod-to-pod communication.

In some embodiments, the application container orchestration platform 200 can support labels and selectors. Labels are key-value pairs that can be used to group together sets of objects, such as pods. Labels can also be used to specify attributes of objects that may be meaningful and relevant to network users. There can be an N×N relationship between objects and labels. Each object can have multiple labels, and each label may be applied to different objects. Each label on an object may have a unique key. The label key can include a prefix and a name. The prefix can be optional. If the prefix exists, it can be separated from the name by a forward slash (/) and be a valid DNS subdomain. The prefix and the name can have specified maximum lengths (e.g., 253 and 63 characters, respectively). Names can start and end with an alphanumeric character (a-z, A-Z, 0-9) and include alphanumeric characters, dots, dashes, and underscores in between. Values can follow the same restrictions as names.

Label selectors can be used to select objects based on their labels, and may include equality-based selectors and set-based selectors. Equality (and inequality) based selectors can allow for selection of objects by key name or value. Matching objects must satisfy specified equality (=or ==) or inequality (!=) operators. Set-based selectors can enable selection of objects according to a set of values, including objects that are "in" or "not in" the set or objects having a key that "exists." An empty label selector can select every object in a collection. A null label selector (which may only be possible for optional selector fields) may select no objects.

In some embodiments, the application container orchestration platform 200 may support container services. A container service is an abstraction which defines a logical set of pods and a policy by which to access them. The set of pods targeted by a container service can be determined by a label selector. Services can be published or discovered through DNS or environment variables. Services can be of different types, such as a ClusterIP, NodePort, LoadBalancer, or ExternalName. A ClusterIP can expose a container service on a cluster-internal IP such that the container service may only be reachable from within the cluster. A NodePort can expose a container service on each node's IP at a static port. A ClusterIP container service, to which the NodePort container service may route, can be automatically created. The NodePort container service can be contacted from outside the cluster by requesting <NodeIP>:<NodePort>. A LoadBalancer can expose a container service externally using a cloud provider's load balancer. NodePort and ClusterIP container services, to which the external load balancer routes, may be automatically created. An ExternalName can map a container service to the contents of a specified Canonical Name (CNAME) record in the DNS.

Figure 3:
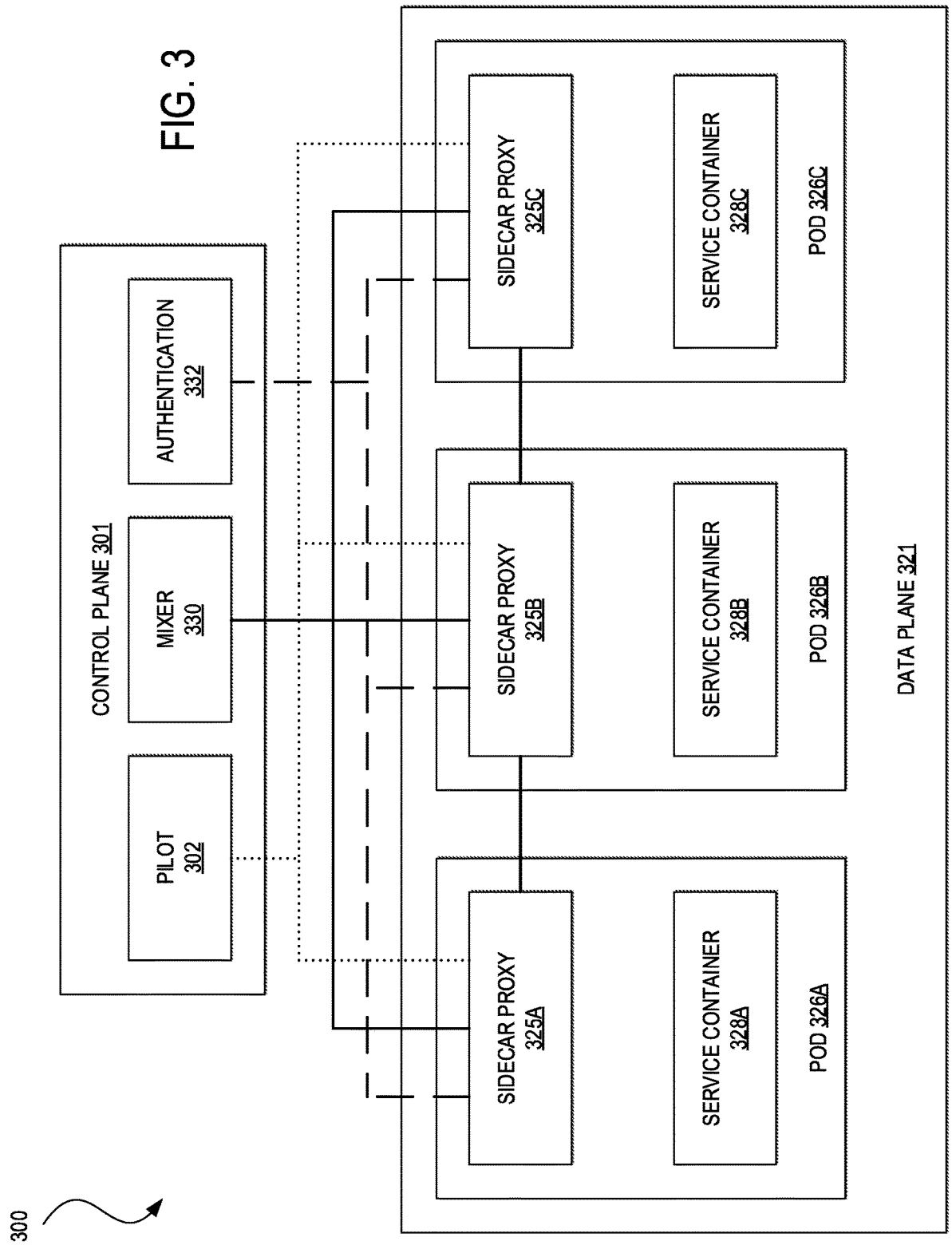
FIG. 3 illustrates a block diagram of an example of a service mesh platform in accordance with an embodiment.

FIG. 3 illustrates a block diagram of an example of a service container orchestration platform or service mesh platform 300 (e.g., the application container orchestration platform 200 of FIG. 2). In some embodiments, the service mesh platform 300 may be based on the Istio® service mesh platform and the Kubernetes® application container orchestration platform. However, other embodiments may utilize other service mesh platforms (e.g., Linux Foundation Linkerd™, Hashicorp Consul®, etc.) and/or other application container orchestration platforms (e.g., Docker Swarm®, Apache Mesos®, etc.) without departing from the scope of the present disclosure.

The service mesh platform 300 may be logically divided into a control plane 301 and a data plane 321. The control plane 301 can be responsible for managing and configuring traffic routing. In addition, the control plane 301 can enforce policy and collect telemetry. In this example, the control plane 301 can include a Pilot 302, a Mixer 330, and an Authentication component 332.

The Pilot 302 (which may correspond to the K8s® master node 202 of FIG. 2) can be used to manage the overall fleet of services or microservices running across a container cluster. The Pilot 302 can ensure that each of the independent and distributed microservices, which may be wrapped as service containers 328B, 328B, 328C (collectively, service containers 328) and inside pods 326A, 326B, 326C (collectively, pods 226), has the current view of the overall container topology and up-to-date routing rules. The Pilot 302 can also provide capabilities such as service discovery, RouteRule, and DestinationPolicy. RouteRule can enable finely grained request distribution. DestinationPolicy can help to address resiliency with timeouts, retries, circuit breakers, and so forth.

The Mixer 330 can enforce access control and usage policies across the service mesh platform 300, and collect telemetry data from the data plane 321 and other services. The Mixer 330 can be used to create Access Control Lists (ACLs), apply rate-limiting rules, and capture custom metrics. In some embodiments, the Mixer 330 can have a pluggable backend architecture to interface with various host environments and infrastructure back ends.

The Authentication component 332 can manage certificate signing, certificate issuance, and revocation/rotation. In some embodiments, the Authentication component 332 can issue x509 certificates to services and microservices, allowing for mutual Transport Layer Security (mTLS) between these services and microservices and transparent encryption of their traffic. In some embodiments, the Authentication component 332 may use service identity built into the underlying container orchestration platform to generate certificates. This identity can allow for policy enforcement.

The data plane 321 can comprise a set of intelligent proxies 325A, 325B, and 325C (collectively, "325") as sidecars. A sidecar is a container that can operate alongside a service container (e.g., the service containers 328) to provide the service container with additional capabilities. The sidecar proxies 325 can mediate and control network communication between services and microservices (along with the Mixer 330). In some embodiments, the sidecar proxies 325 may be implemented as Envoy™ Proxies. The sidecar proxies 325 can support load balancing for Hypertext Transfer Protocol Version 1.1 (HTTP/1.1), HTTP/2, Quick User Data Protocol (UDP) Internet Connections (QUIC), and general-purpose Remote Procedure Calls (gRPC). In addition, the sidecar proxies 325 can provide request-level metrics, tracing spans, active and passive health checking, and service discovery, among other tasks.

Figure 4:
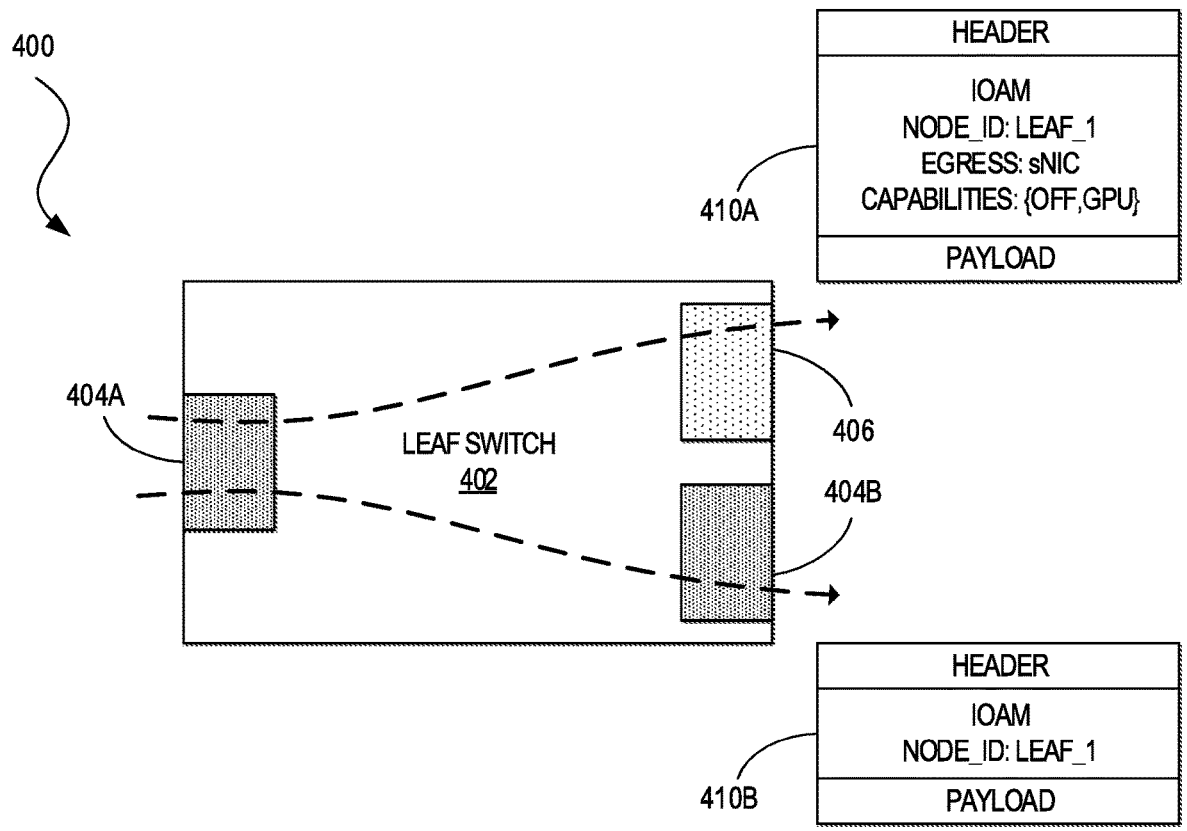
FIG. 4 illustrates a block diagram of an example approach for exchanging capability information of a smart network interface card (NIC) in accordance with an embodiment.

FIG. 4 illustrates a block diagram of an example approach 400 for exchanging capability information of a smart network interface card (NIC) via the data plane of a network (e.g., the network 100). The example approach 400 shows a leaf switch 402 (e.g., the leaf switch 106) that includes a standard ingress interface 404A (e.g., standard NIC), a standard egress interface 404B, and a smart NIC interface 406. The leaf switch 402 may leverage in-bound or in-situ operations, administration, and management (IOAM) for transmitting the capability information of the smart NIC to one or more neighboring network elements (e.g., servers, network devices, network appliances, etc.). For example, when traffic enters the ingress interface 404A for transit through the smart NIC interface 406, the smart NIC can affix egress information (e.g., "Egress: sNIC") and capability information (e.g., "Capabilities: offload, GPU") of the smart NIC to an IOAM portion 410A of the traffic. When traffic enters the standard ingress interface 404A for transit through the standard egress interface 404B, the leaf switch 402 does not provide the egress information or the capability information of the smart NIC in the IOAM portion 410B of the traffic.

IOAM can refer to an approach to record OAM and telemetry information within a data packet while the data packet traverses a network or a particular network domain. The term "in-situ" or "in-band" can refer to the OAM and telemetry data being carried within data packets rather than being sent within packets specifically dedicated to OAM. IOAM mechanisms (also sometimes referred to as embedded network telemetry) have been defined for various network technologies, such as P4, a programming language for programming of packet forwarding planes; Session Protocol for User Datagrams (SPUD); and Internet Protocol version 4 (IPv4) (e.g., in the IPv4 route record option defined in Internet Engineering Task Force (IETF) Request for Comments (RFC) 791).

IOAM mechanisms can complement "out-of-band" mechanisms such as ping or traceroute. IOAM mechanisms can be leveraged where out-of-band mechanisms may not apply or do not offer the desired characteristics or requirements of a network operator, such as proving that certain traffic takes a pre-defined path, strict congruency is desired, checking service level agreements (SLAs) for live data traffic, detailed statistics on traffic distribution paths in networks that distribute traffic across multiple paths, or scenarios where probe traffic is potentially handled differently from regular data traffic by network devices.

IOAM can have the following capabilities or features:
A flexible data format to allow different types of information to be captured as part of an IOAM operation, including path tracing information and additional operational and telemetry information, such as timestamps, sequence numbers, or generic data (e.g., queue size, geo-location of a forwarding node, etc.);
A data format to express node identifiers and link identifiers to record the path a packet takes with a fixed amount of added data;
The ability to detect whether any nodes were skipped while recording IOAM information (e.g., where IOAM may not be supported or not enabled on those nodes);
The ability to actively process information in the packet (e.g., to prove in a cryptographically secure way that a packet actually took a pre-defined path using some traffic steering method, such as service chaining or traffic engineering);
The ability to include OAM data in various different transport protocols.

Additional details regarding IOAM can be found in IETF drafts "Requirements for In-band OAM" (discussing the motivation and requirements for including specific operational and telemetry information into data packets while the data packet traverses a path between two points in a network), "Data Formats for In-band OAM" (discussing the data types and data formats for in-band OAM data records), "GRE encapsulation for IOAM data," "NSH encapsulation for IOAM data," "Geneve encapsulation for IOAM data," "VXLAN-GPE encapsulation for IOAM data," "IPv6 encapsulation for IOAM data," "SRv6 encapsulation for IOAM data," "Proof of Transit" (discussing mechanisms to securely prove that traffic transited a defined path), and "Export of IOAM data in raw format" (discussing how IOAM data can be exported in raw (e.g., uninterpreted) format from network devices to systems using IP Flow Information Export (IPFIX), each of which are incorporated herein by reference.

Utilizing IOAM to exchange capability information of a smart NIC in a network can be especially advantageous because it can provide affirmation that a packet flow actually traverses or transits the smart NIC and that offloading does not require any path changes to the network.

In some embodiments, the leaf switch 402 can also advertise the capability information of the smart NIC via the control plane of the network. For example, Cisco® Discovery Protocol (CDP) or Link Layer Discovery Protocol (LLDP) can be extended to enable the leaf switch 402 to provide smart NIC capability information to one or more neighboring network elements, including servers (e.g., servers installed with the "lldap" package for Linux®), network devices, and network appliances. In particular, CDP and/or LLDP can be extended to add the capability information of smart NICS during the discovery process of these protocols. In this manner, nodes that are connected to servers hosting virtualized network functions (V-NFs) (e.g., virtual network functions (VNFs), cloud-native network functions (CNFs), etc.) can signal the capability information of the nodes' smart NICs to the servers over CDP and/or LLDP.

In other embodiments, Extended Address Resolution Protocol (ARP) or Neighbor Discovery Protocol (NDP) can be utilized by the leaf switch 402 for signaling the capabilities of its smart NIC. For example, E-ARP has been proposed as a means to carry additional data (e.g., Multi-Protocol Label Switching (MPLS) labels) in traffic. E-ARP or NDP can be further extended to include the capability information of nodes' smart NICs in the nodes' responses to E-ARP or NDP requests.

In still other embodiments, the leaf switch 402 may be capable of utilizing both data plane mechanisms (e.g., IOAM) and control plane mechanisms (e.g., CDP, LLDP, E-ARP, NDP, etc.) for exchanging capability information depending on the preference of the network operator. For example, Cisco Nexus® 3000 Series switches and Cisco Nexus® 7000 Series switches may include ASICs that support IOAM technology and can also support CDP, LLDP, E-ARP, NDP, or other control plane protocols to enable a network operator to configure smart NIC capability signaling over the data plane and/or control plane of a network.

Figure 5:
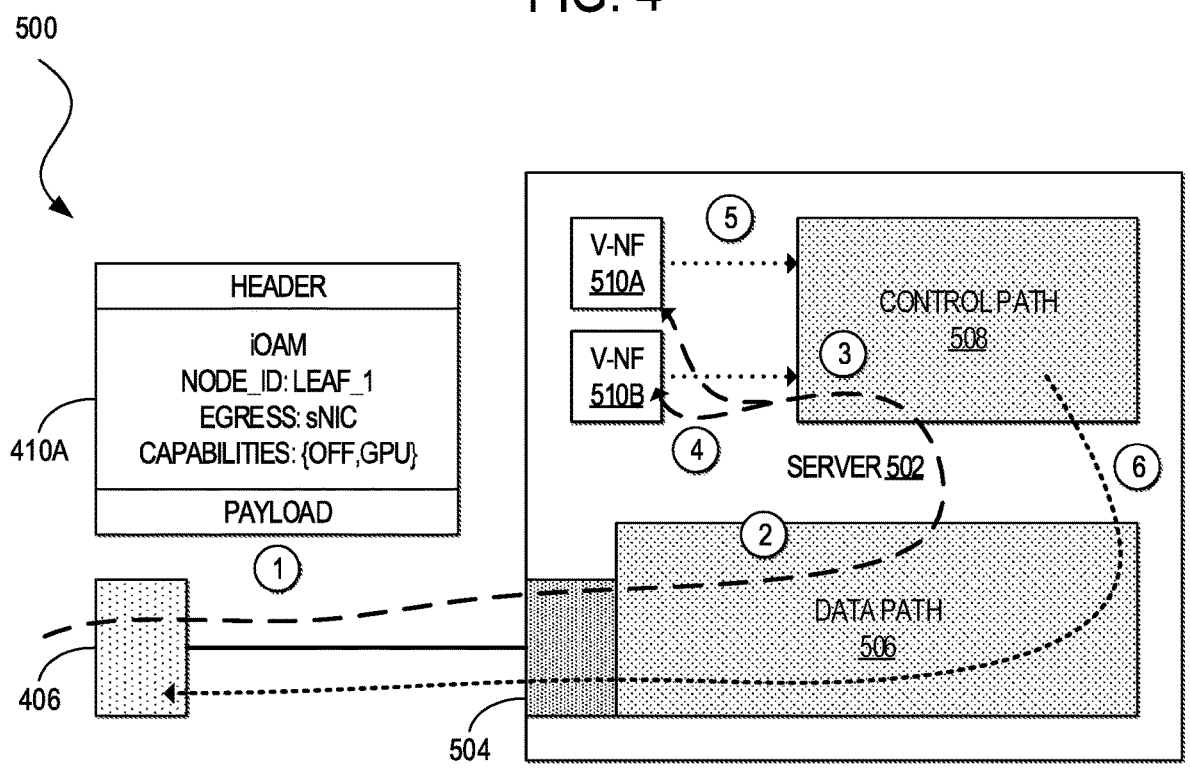
FIG. 5 illustrates a block diagram of an example approach for offloading a networking task from a virtualized network function to a remote smart NIC in accordance with an embodiment.

FIG. 5 illustrates a block diagram of an example approach 500 for offloading a network processing task from a virtualized network function (V-NF) (e.g., a virtual network function (VNF), cloud-native network function (CNF), etc.) to a remote smart NIC. The example approach 500 shows the remote smart NIC 406 (remote relative to a physical server 502) transmitting its capability information to the physical server 502. In particular, the remote smart NIC 406 can embed the capability information in the IOAM portion 410A of traffic for transmission to a standard NIC 504 of the physical server 502 where it can be received by a data path element 506 (e.g., OVS data path, OVS-DPDK data path, Fast data—Input/Output (FD.io) vector packet processing (VPP), etc.) of the server. The data path element 506 can extract the remote smart NIC capability information from the IOAM portion 410A of the traffic and update a control path element 508 (e.g., OVS, OVS/Contiv, the proxy 224, the sidecar proxy 325, etc.) of the physical server 502.

In some embodiments, the data path element 506 can be implemented using FD.io VPP. VPP is an open source data plane processing platform for optimizing I/O in a virtualized computing system (e.g., the physical servers 110B and 110C). VPP can run as a Linux user-space process, and VPP drivers can provide NIC access over Peripheral Component Interconnect (PCI). VPP can process multiple packets with similar characteristics (referred to as vectors). Packets can be removed from the receive rings of the interface and can be formed into a packet vector, to which a processing graph may be applied. The processing graph can represent the network features that need to be applied (e.g., IPv4 forwarding, classification, multicast, etc.). This approach can minimize interrupts and traversing a call stack and thereby minimize thrashing of instruction caches and misses. VPP can process multiple packets at a time, making it a high-performance processing stack that can support various advanced network functions, such as Dynamic Host Configuration Protocol (DHCP), segment routing (SR) (e.g., Segment Routing over IPv6 data plane (SRv6)), Address Resolution Protocol (ARP), Layer 2 Transport Protocol version 3 (L2TPv3), virtual routing and forwarding (VRFs), IPv6, and MPLS-over Ethernet, among others. VPP is capable of inserting, updating, and extracting IOAM data from data packets, and the data path element 506 implementing VPP can thus be programmed to extract IOAM data from network traffic and transmit the IOAM data to the control path element 508.

After receiving the smart NIC capability information from the data path element 506, the control path element 508 can signal virtualized network functions (V-NFs) 510A and 510B (collectively, 510) (e.g., VNFs, CNFs, etc.) the network processing tasks that can be offloaded to the remote smart NIC 406. When the V-NFs 510 offload a particular network processing task to the remote smart NIC 406, the V-NFs 510 can transmit the offload instructions to the control path element 508. The control path element 508 can provide processing information (e.g., match tables, actions, state information, encapsulation information, statistics, etc.) to the remote smart NIC 406 for performing the offloaded network processing task.

The example approach 500 utilizes an offload model in which the control path element 508 can operate as an intermediary between the V-NFs 510 and the remote smart NIC 406, and the data path element 506 can reside in the physical server 502. The data path element 506 can reside in different locations in various embodiments, such as in a Network Function Virtualization Infrastructure (NFVi) data path, in the kernel space of a physical server, in the user space of a physical server, in a virtual switch of a physical server, in a smart NIC of a physical server, in a physical switch connected to a physical server, in an embedded network function (eNF) or plugin in these environments, and so forth. In these various offload models, the control path element 508 can use the capability information of neighboring smart NICs to program them with the relevant match tables, actions, state information, encapsulation information, statistics, and so forth.

Figure 6A:
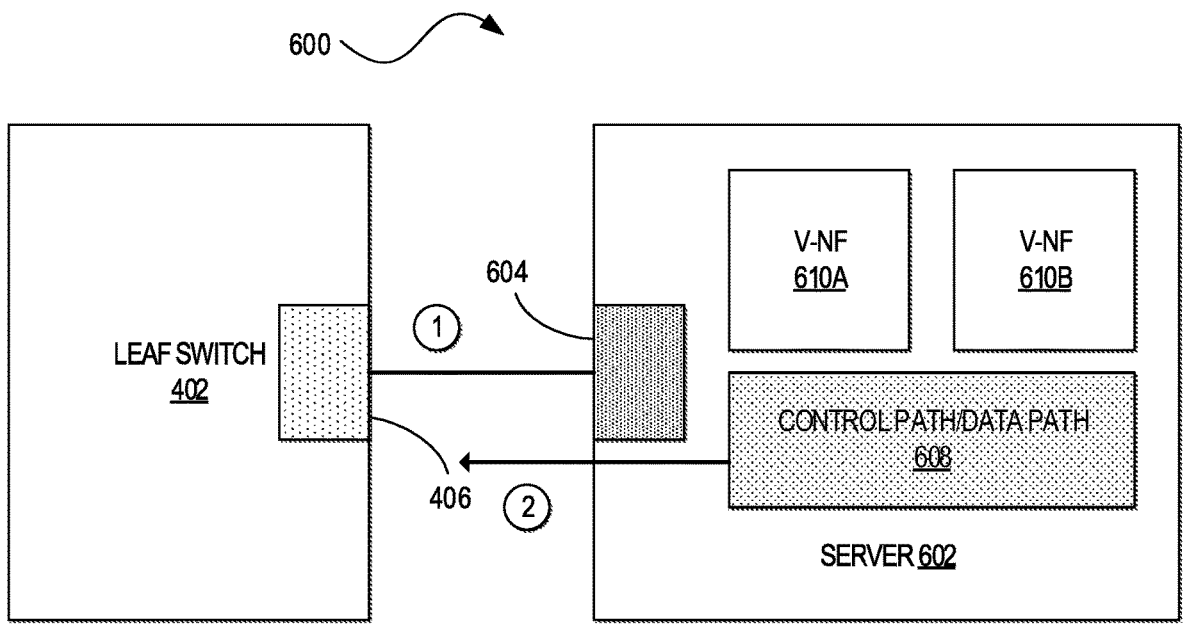
FIGS. 6A-6C illustrate block diagrams of example use cases for accelerating and offloading network processing tasks from virtualized network functions to a remote smart NIC in accordance with some embodiments.
Figure 6B:
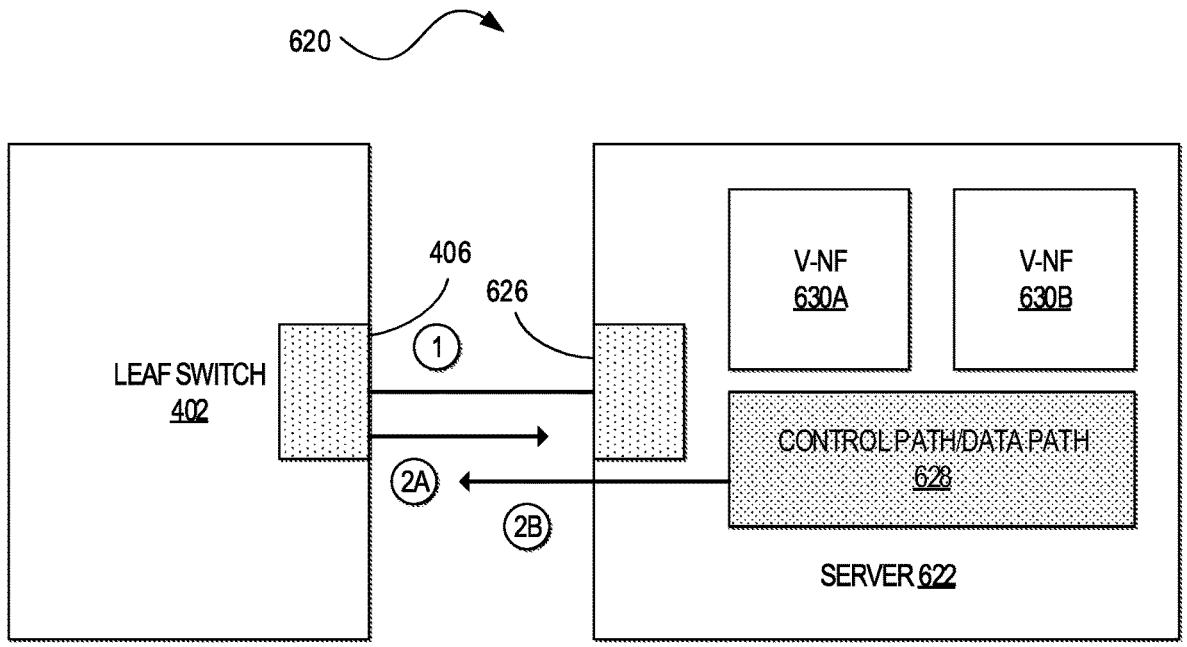
Figure 6C:
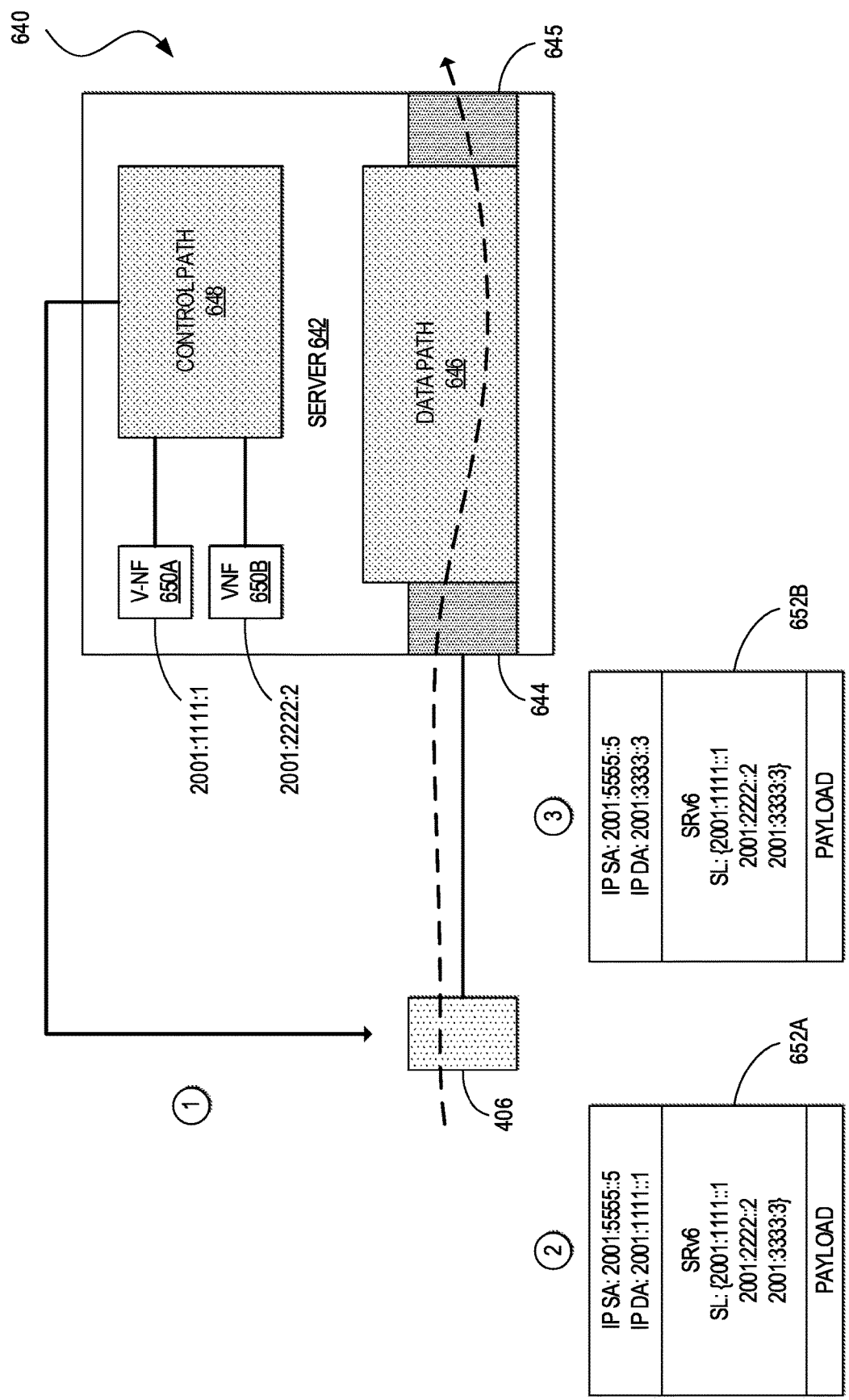

FIGS. 6A-6C illustrate block diagrams of example use cases for accelerating and offloading network processing tasks from virtualized network functions (V-NFs) (e.g., VNFs, CNFs, etc.) to a remote smart NIC. In particular, FIG. 6A shows an example use case 600 including the leaf switch 402 and a physical server 602. The leaf switch 402 includes the remote smart NIC 406 (remote relative to the physical server 602). The physical server 602 does not have smart NIC capabilities but can include a standard NIC 604. In the example use case 600, the smart NIC 406 and a control path element 608 (e.g., OVS, OVS/Contiv, the proxy 224, the sidecar proxy 325, etc.) of the physical server 602 can negotiate and establish a control plane session. Thereafter, V-NFs 610A and 610B in the physical server 602 may offload network services to the remote smart NIC 406 via the control path element 608.

FIG. 6B shows an example use case 620 including the leaf switch 402 and a physical server 622. The leaf switch 402 includes the smart NIC 406. In this example, the physical server 622 includes a smart NIC 626. After the smart NIC 406 and a control path element 628 of the physical server 622 negotiate and establish a control plane session, service offload can occur on either side for load balancing purposes. For example, the control path element 628 can determine a current load of the smart NIC 406 and/or a current load of the smart NIC 626 and offload network services of V-NFs 630A and 630B in the physical server 622 to the smart NICs in respective portions based on the current load(s). Alternatively or in addition, a control path element (not shown) of the leaf switch 402 can determine a current load of the smart NIC 406 and/or a current load of the smart NIC 626 and offload network services to the smart NIC in respective portions based on the current load(s).

FIG. 6C shows an example use case 640 involving Segment Routing over IPv6 data plane (SRv6). The example use case 640 includes the smart NIC 406 and a physical server 642. The physical server 642 can include standard NICs 644 and 645, a data path element 646 (e.g., OVS data path, OVS-DPDK data path, FD.io VPP, etc.), a control path element 648 (e.g., OVS, OVS/Contiv, the proxy 224, the sidecar proxy 325, etc.), and V-NFs 650A and 650B. In this example, the smart NIC 406 may have previously exchanged its capabilities with the control path element 628 over the data plane (e.g., IOAM) or control plane (e.g., CDP, LLDP, E-ARP, NDP, etc.), and the control path element 628 may have previously signaled the capabilities of the smart NIC 406 to the V-NFs 650A and 650B. The V-NFs 650A and 650B may be programmed to perform certain network processing tasks on SRv6 packets but may offload these tasks to the smart NIC 406 via the control path element 648. For example, the control path element 648 can offload SRv6 End behavior along with processing information (e.g., match tables, actions, state information, encapsulation information, statistics, etc.) to the smart NIC to apply on SRv6 packets. When the matching packets (e.g., packet including SRv6 portion 652A) arrive at the smart NIC 406, the smart NIC can perform the networking processing tasks provided by the control path element 648 to the packets (e.g., packet including SRv6 portion 652B) and forward the traffic through the standard NIC 644, the data path element 646, and the standard NIC 645.

Figure 7:
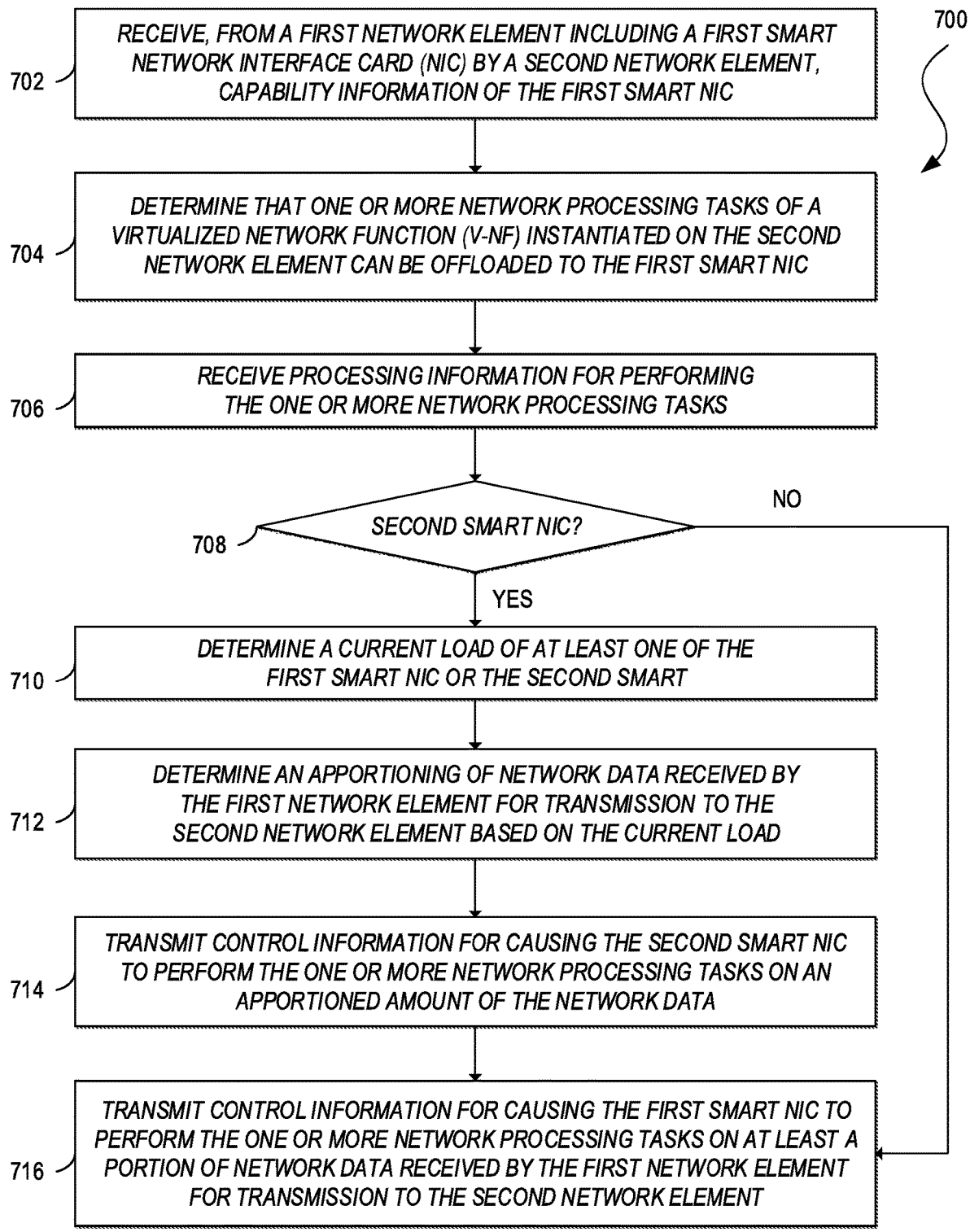
FIG. 7 illustrates a flow chart of an example process for accelerating and offloading a network processing task of a virtualized network function in accordance with an embodiment.

FIG. 7 illustrates a flow chart of an example of a process 700 for accelerating and offloading a network processing task of a virtualized network function (V-NF) (e.g., VNF, CNF, etc.). One of ordinary skill will understood that, for any processes discussed herein, there can be additional, fewer, or alternative steps performed in similar or alternative orders, or in parallel, within the scope of the various embodiments unless otherwise stated. The process 700 may be performed by a network element, such as a physical server (e.g., the physical servers 110), a virtualized server (e.g., the virtual machines 120A, the containers 120B, or other virtual network partitions), physical or virtual network device (e.g., switch, router, application accelerator, network address translator (NAT), load balancer, firewall, a distributed denial of service (DDoS) mitigator, deep packet inspector (DPI), intrusion prevention system (IPS), intrusion detection system (IDS), Internet Protocol Security (IPSec) system, session border controller (SBC), traffic monitor, Evolved Packet Core (EPC) function, WAN optimizer, etc.), or a smart NIC of a network element.

The process 700 may begin at step 702 in which a first smart NIC of a first network element (e.g., a physical or virtual server or network device) can transmit the capabilities of the first smart NIC for receipt by one or more neighboring network elements (e.g., physical or virtual servers or network devices). In some embodiments, the exchange can occur over the data plane (e.g., via in-band or in-situ operations, administration, and management (IOAM)). For example, the first smart NIC can affix the capability information to an IOAM portion of data packets. Alternatively or in addition, the exchange can occur over the control plane (e.g., via Cisco® Discovery Protocol (CDP), Link Layer Discovery Protocol (LLDP), Extended Address Resolution Protocol (E-ARP), Neighbor Discovery Protocol (NDP), etc.). For example, these protocols can be extended so that the capability information of the smart NIC can be exchanged during a discovery phase of the protocols.

The process 700 can proceed to step 704 in which a second network element among the one or more neighboring elements can determine whether one or more network processing tasks of a V-NF instantiated on the second network element can be offloaded to the first smart NIC. That is, the second network element can determine whether the first smart NIC is capable of performing the one or more network processing tasks based on the capability information received at step 702.

At step 706, the second network element can receive processing information from the V-NF for performing the one or more network processing tasks. In some embodiments, the second network element can signal the capability information of the first smart NIC to the V-NF and the V-NF can determine to offload the one or more network processing tasks and then transmit the offload instructions to the second network element. In other embodiments, the second network element may determine that the one or more network processing tasks can be offloaded from the V-NF and then retrieve the offload instructions from the V-NF.

The process 700 may continue to decision block 708 in which it may be determined whether the second network element has access to a second smart NIC. For example, the second smart NIC may be integrated in the second network element, in a third network element neighboring the second network element, or in the first network element, among other possibilities.

If the second network element does not have access to a second smart NIC, the process 700 may conclude at step 716 in which the second network element may convert the processing information received at step 706 to control information and transmit the control information for causing the first smart NIC to perform the one or more network processing tasks on at least a portion of network data received by the first network element for transmission to the second network element. In some embodiments, this can involve the second network element negotiating and establishing a control plane session with the first smart NIC and programming the first smart NIC to perform the one or more network processing tasks. In other embodiments, the second network element can transmit the control information to a network controller (e.g., the network fabric controller 108, a Network Function Virtualization Orchestrator (NFVO), the master node 202, the Pilot 302, etc.) for programming the first smart NIC to perform the one or more network processing tasks.

The control information can include matching tables or rules (e.g., n-tuple matching, wildcard matching, string or regular expression matching, etc.), actions (e.g., forwarding, quality of service (QoS) policies, header modification, etc.), encapsulation information (e.g., tunnel origination/termination, tunnel conversion, etc.), and state information (e.g., connection or session-based security policies, monitoring/statistics, mirroring, logging, state synchronization, etc.), among others. The control information can also include more granular information, such as instructions for or relating to online charging and granular charging (e.g., rating groups), firewall (e.g., rule based policies, access control lists, etc.), stateful firewall (e.g., permitting forward and reverse traffic for a TCP connection or UDP session or handling related flows (e.g., File Transmission Protocol (FTP) control and data, Session Initiation Protocol (SIP) signaling and media, etc.)), subscriber firewall (e.g., rate limiting, flow counting, etc.), intrusion prevention (e.g., scanning network for malware or exploits, flow inspection depth (e.g., offloading the rest of a micro-flow once no further intrusions are possible, etc.)), anti-virus, web filtering, anti-spam, traffic monitoring/analytics, encryption/decryption, compression, transcoding, and so forth. In some embodiments, the second network element can directly program the first smart NIC to perform the one or more network processing tasks. In other embodiments, the second network element may transmit the control information to a centralized network controller for programming the first smart NIC to perform the one or more network processing tasks.

If, on the other hand, there is a second smart NIC available to the second network element at decision block 708, the process 700 may continue to step 710 in which the second network element can determine a current load of the first smart NIC and/or a second smart NIC (e.g., incorporated in the first network element, the second network element, a third network element neighboring the second network element, etc.). At step 712, the second network element can determine how to apportion the network data received by the first network element for transmission to the second network data based on the current load. At step 714, the second network element can transmit control information to the first network element that causes the first smart NIC to perform the one or more network processing tasks on a first apportioned amount of network data. The process 700 may conclude at step 716 in which the second network element can transmit control information that causes the second smart NIC to perform the one or more network processing tasks on a second apportioned amount of the network data.

FIG. 8 illustrates a block diagram of an example of a network device 800 (e.g., switch, router, network appliance, etc.). The network device 800 can include a master central processing unit (CPU) 802, interfaces 804, and a bus 806 (e.g., a PCI bus). When acting under the control of appropriate software or firmware, the CPU 802 can be responsible for executing packet management, error detection, and/or routing functions. The CPU 802 preferably accomplishes all these functions under the control of software including an operating system and any appropriate applications software. The CPU 802 may include one or more processors 808 such as a processor from the Motorola family of microprocessors or the MIPS family of microprocessors. In an alternative embodiment, the processor 808 can be specially designed hardware for controlling the operations of the network device 800. In an embodiment, a memory 810 (such as non-volatile RAM and/or ROM) can also form part of the CPU 802. However, there are many different ways in which memory could be coupled to the system.

The interfaces 804 can be provided as interface cards (sometimes referred to as line cards). The interfaces 804 can control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 804 may include ports appropriate for communication with the appropriate media. In some cases, the interfaces 804 may also include an independent processor and, in some instances, volatile RAM. The independent processors may control communication intensive tasks such as packet switching, media control, and management. By providing separate processors for the communication intensive tasks, the interfaces 804 may allow the CPU 802 to efficiently perform routing computations, network diagnostics, security functions, and so forth.

Although the system shown in FIG. 8 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 800.

Regardless of the network device's configuration, it may employ one or more memories or memory modules (including the memory 810) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 9A:
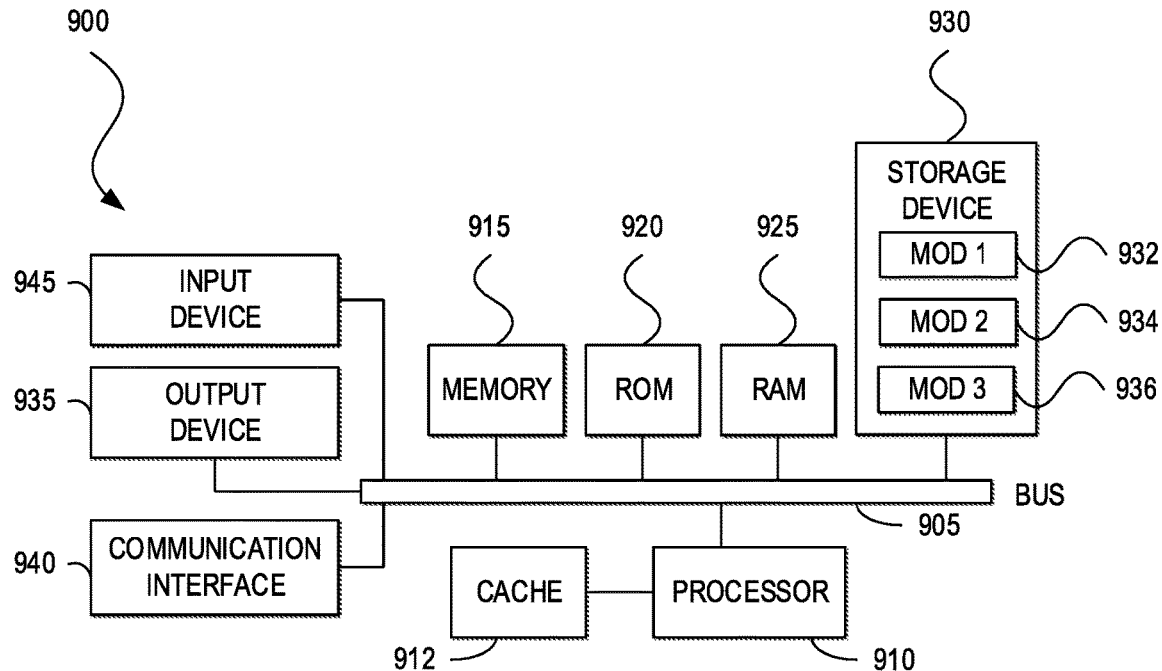
FIGS. 9A and 9B illustrate block diagrams of examples of systems in accordance with some embodiments.
Figure 9B:
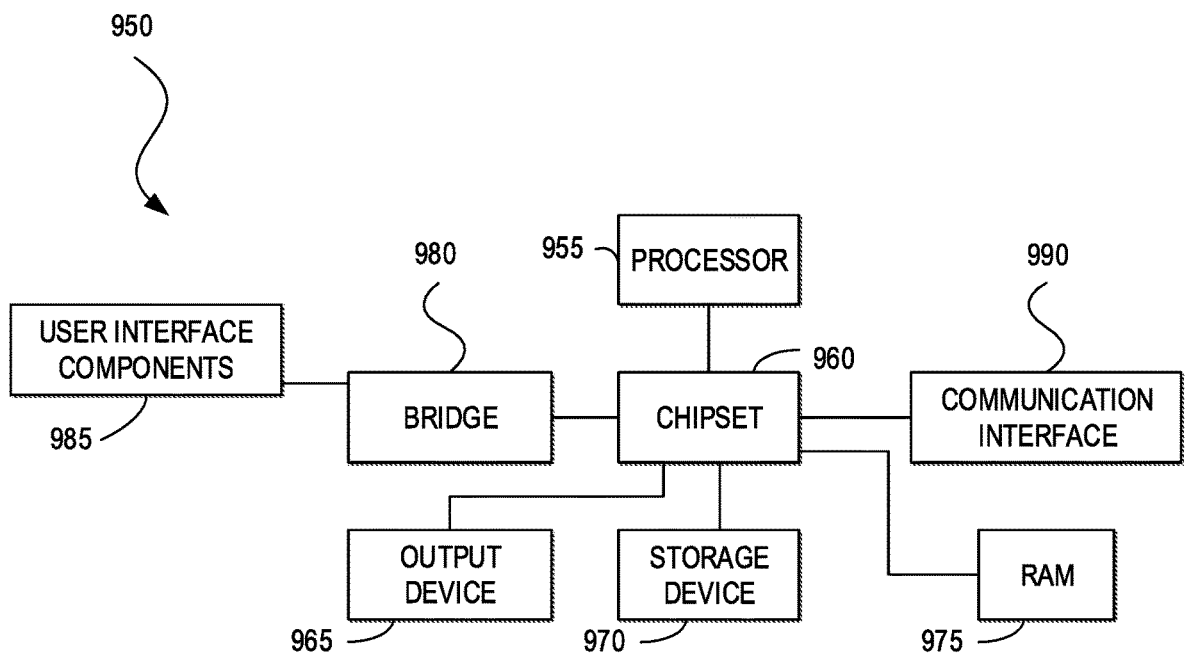

FIG. 9A and FIG. 9B illustrate block diagrams of examples of systems for implementing various embodiments of the present disclosure. The more appropriate system will be apparent to those of ordinary skill in the art when practicing the various embodiments. Persons of ordinary skill in the art will also readily appreciate that other systems are possible.

FIG. 9A illustrates an example of a bus computing system 900 wherein the components of the system are in electrical communication with each other using a bus 905. The computing system 900 can include a processing unit (CPU or processor) 910 and a system bus 905 that may couple various system components including the system memory 915, such as read only memory (ROM) 920 and random access memory (RAM) 925, to the processor 910. The computing system 900 can include a cache 912 of high-speed memory connected directly with, in close proximity to, or integrated as part of the processor 910. The computing system 900 can copy data from the memory 915, ROM 920, RAM 925, and/or storage device 930 to the cache 912 for quick access by the processor 910. In this way, the cache 912 can provide a performance boost that avoids processor delays while waiting for data. These and other modules can control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in the storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing system 900, an input device 945 can represent any number of input mechanisms, such as a microphone for speech, a touch-protected screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing system 900. The communications interface 940 can govern and manage the user input and system output. There may be no restriction on operating on any particular hardware arrangement and therefore the basic features here may easily be substituted for improved hardware or firmware arrangements as they are developed.

The storage device 930 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 930 can include the software modules 932, 934, 936 for controlling the processor 910. Other hardware or software modules are contemplated. The storage device 930 can be connected to the system bus 905. In some embodiments, a hardware module that performs a particular function can include a software component stored in a computer-readable medium in connection with the necessary hardware components, such as the processor 910, bus 905, output device 935, and so forth, to carry out the function.

FIG. 9B illustrates an example architecture for a chipset computing system 950 that can be used in accordance with an embodiment. The computing system 950 can include a processor 955, representative of any number of physically and/or logically distinct resources capable of executing software, firmware, and hardware configured to perform identified computations. The processor 955 can communicate with a chipset 960 that can control input to and output from the processor 955. In this example, the chipset 960 can output information to an output device 965, such as a display, and can read and write information to storage device 970, which can include magnetic media, solid state media, and other suitable storage media. The chipset 960 can also read data from and write data to RAM 975. A bridge 980 for interfacing with a variety of user interface components 985 can be provided for interfacing with the chipset 960. The user interface components 985 can include a keyboard, a microphone, touch detection and processing circuitry, a pointing device, such as a mouse, and so on. Inputs to the computing system 950 can come from any of a variety of sources, machine generated and/or human generated.

The chipset 960 can also interface with one or more communication interfaces 990 that can have different physical interfaces. The communication interfaces 990 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 955 analyzing data stored in the storage device 970 or the RAM 975. Further, the computing system 950 can receive inputs from a user via the user interface components 985 and execute appropriate functions, such as browsing functions by interpreting these inputs using the processor 955.

It will be appreciated that computing systems 900 and 950 can have more than one processor 910 and 955, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
receiving, at a second network element over a network from a first network element, an advertisement including capability information of a first smart network interface card (NIC) installed at the first network element, wherein the first network element is remotely and physically located from the second network element;
in response to receiving the advertisement, determining, based on the received capability information and at the second network element, that one or more network processing tasks of a virtualized network function instantiated in the second network element can be offloaded to the first smart NIC;
receiving, at the second network element from the virtualized network function, processing information for performing the one or more network processing tasks; and
transmitting, from the second network element based on the processing information to the first network element, control information that causes the first smart NIC to perform the one or more network processing tasks on at least a portion of network data received by the first network element for transmission to the second network element.

2. The computer-implemented method of claim 1, further comprising: determining that a second smart NIC is accessible to the second network element; determining a current load of at least one of the first smart NIC or the second smart NIC; and determining an apportioning of the network data based on the current load, wherein the control information further causes the second smart NIC to perform the one or more network processing tasks on an apportioned amount of the network data.

3. The computer-implemented method of claim 2, wherein the second smart NIC is integrated in the second network element.

4. The computer-implemented method of claim 2, wherein the second smart NIC is integrated in a third network element neighboring the second network element.

5. The computer-implemented method of claim 1, wherein the capability information is received within an in-bound or in-situ operations, administration, and management (IOAM) portion of data traffic.

6. The computer-implemented method of claim 5, further comprising: extracting, by a data path element of the second network element, the capability information from the IOAM portion of the data traffic; and updating, by the data path element, a control path element of the second network element with the capability information.

7. The computer-implemented method of claim 6, wherein the data path element includes a Fast data-Input/Output (Fd.IO) vector packet processor (VPP).

8. The computer-implemented method of claim 6, wherein the data path element resides in kernel space of the second network element.

9. The computer-implemented method of claim 6, wherein the data path element resides in user space of the second network element.

10. The computer-implemented method of claim 6, wherein the data path element resides in the first smart NIC.

11. The computer-implemented method of claim 6, wherein the control path element includes at least one of an Open Virtual Switch (OVS) switch, a Contiv plugin, a Kubernetes proxy, or an Istio sidecar proxy.

12. The computer-implemented method of claim 1, the capability information is received via at least one of Cisco Discovery Protocol (CDP), Link Layer Discovery Protocol (LLDP), Extended Address Resolution Protocol (E-ARP), or Neighbor Discovery Protocol (NDP).

13. A system, comprising:
one or more processors; and
memory including instructions that, when executed by the one or more processors, cause the system to:
receive, over a network from a first network element, an advertisement including capability information of a first smart network interface card (NIC) installed at the first network element, wherein the first network element is remotely and physically located from a second network element;
in response to receiving the advertisement, determine, based on the received capability information, that one or more network processing tasks of a virtualized network function instantiated in the system can be offloaded to the first smart NIC;
receive, from the virtualized network function, processing information for performing the one or more network processing tasks; and
transmit, to the first network element and based on the processing information, control information that causes the first smart NIC to perform the one or more network processing tasks on at least a portion of network data received by the first network element for transmission to the system.

14. The system of claim 13, wherein the instructions, when executed, further cause the system to: determine that a second smart NIC is accessible to the system;
determine a current load of at least one of the first smart NIC or the second smart NIC; and
determine an apportioning of the network data based on the current load,
wherein the control information further causes the second smart NIC to perform the one or more network processing tasks on an apportioned amount of the network data.

15. The system of claim 14, wherein the second smart NIC is integrated in the first network element.

16. The system of claim 13, wherein the capability information is received over a control plane protocol.

17. A non-transitory computer-readable storage medium including instructions that, upon being executed by one or more processors of a system, cause the system to:
receive, over a network from a first network element, an advertisement including capability information of the first smart network interface card (NIC) installed at the first network element, wherein the first network element is remotely and physically located from a second network element;
in response to receiving the advertisement, determine, based on the received capability information, that one or more network processing tasks of a virtualized network function instantiated in the system can be offloaded to the first smart NIC,
receive, from the virtualized network function, processing information for performing the one or more network processing tasks; and
transmit, to the first network element and based on the processing information, control information that causes the first smart NIC to perform the one or more network processing tasks on at least a portion of network data received by the first network element for transmission to the system.

18. The non-transitory computer-readable storage medium of claim 17, wherein the capability information is received in data traffic.

19. The non-transitory computer-readable storage medium of claim 18, wherein the instructions, when executed, further cause the system to:
extract, by a data path element of the system, the capability information from the data traffic; and
update, by the data path element, a control path element of the system with the capability information.

20. The non-transitory computer-readable storage medium of claim 19, wherein the data path element includes a Fast data-Input/Output (Fd.IO) vector packet processor (VPP).

* * * * *